United States Patent [19]

Döpke

[11] Patent Number: 5,544,546
[45] Date of Patent: Aug. 13, 1996

[54] TRANSMISSION ARRANGEMENT

[75] Inventor: Stefan Döpke, Epplelheim, Germany

[73] Assignee: Heidelberger Druckmaschinen AG, Heidelberg, Germany

[21] Appl. No.: 245,654

[22] Filed: May 18, 1994

[30] Foreign Application Priority Data

May 18, 1993 [DE] Germany .......................... 43 16 599.0

[51] Int. Cl.$^6$ .................................................. F16H 53/06
[52] U.S. Cl. .................... 74/569; 74/54; 74/567
[58] Field of Search ................ 74/567–569, 54

[56] References Cited

U.S. PATENT DOCUMENTS

| | | | |
|---|---|---|---|
| 2,908,186 | 10/1959 | Meyer | 74/569 |
| 4,069,724 | 1/1978 | Sobotta | 74/569 |
| 4,583,728 | 4/1986 | Mathes | 74/54 X |
| 4,969,368 | 11/1990 | Sekine et al. | 74/569 X |
| 4,984,607 | 1/1991 | Beyaert | 74/54 X |
| 4,993,275 | 2/1991 | Pollich et al. | 74/569 |

FOREIGN PATENT DOCUMENTS

| | | | |
|---|---|---|---|
| 2636394 | 3/1990 | France | 74/569 |
| 2022245 | 11/1970 | Germany | 74/54 |
| 227629 | 9/1985 | Germany | 74/569 |
| 3830946 | 5/1991 | Germany | 74/569 |
| 1-288659 | 11/1989 | Japan | 74/54 |
| 6-2750 | 1/1994 | Japan | 74/54 |
| 715867 | 2/1980 | U.S.S.R. | 74/54 |
| 1093844 | 5/1984 | U.S.S.R. | 74/54 |

OTHER PUBLICATIONS

VEB Verlag Technik Publication, 1989, 4 pages, "Kurvengetriebe" (Cam Transmissions).

*Primary Examiner*—Vinh T. Luong
*Attorney, Agent, or Firm*—Herbert L. Lerner; Laurence A. Greenberg

[57] ABSTRACT

A transmission arrangement includes a plurality of transmission linkages, of which at least one performs an oscillating movement which is repeated during each period. A control cam is formed on a first transmission linkage and a feeler roller is rotatably mounted on a second transmission linkage. The control cam and a contact surface of the feeler roller are in operative rolling contact during at least part of a period repeating in the respective periods. The second transmission linkage has a degree of freedom with respect to a bearing support which allows shifting due to deflections of the feeler roller mounted on the second transmission linkage as a result of a relative movement between the control cam and the feeler roller. A point on the contact surface of the feeler roller which coincides with a first contact point in a first operational setting of the second transmission linkage coincides at least approximately with a second contact point in a second operational setting of the second transmission linkage.

4 Claims, 2 Drawing Sheets

TRANSMISSION ARRANGEMENT

BACKGROUND OF THE INVENTION

Field of the Invention

The invention relates to a transmission arrangement including a plurality of transmission linkages, of which at least one performs an oscillating movement which is repeated, after the termination of a period in the course of a respectively further period, a control cam formed on a first one of the transmission linkages, a feeler roller rotatably mounted on a second one of the transmission linkages and representing a third transmission linkage, the control cam and a contact surface of the feeler roller being in operative rolling contact during at least part of a period repeating in the respective periods, a bearing support for the second transmission linkage, the second transmission linkage having a degree of freedom with respect to the bearing support for shifting the second transmission linkage due to deflections of the feeler roller mounted on the second transmission linkage as a result of a relative movement between the control cam and the feeler roller, the second transmission linkage having a first operational setting in the respective part of the period in accordance with a first contact location of the control cam with the feeler roller situated on the control cam, and the second transmission linkage also having a second operational setting in the respective part of the period in accordance with a second contact location of the control cam with the feeler roller.

SUMMARY OF THE INVENTION

Such a transmission arrangement has become known heretofore, for example, from the published German Patent Document DE 38 30 946 C2 and is used in accordance with the constructions disclosed therein for periodically swivelling a pregripper of a sheet-fed rotary printing press. Particularly with such use, do production-conditioned deviations from the theoretical perfection or ideal of individual components of a transmission arrangement of the foregoing general type in a practical application become especially disadvantageously noticeable, and indeed in the form of register deviations of a marked order of magnitude.

It is accordingly an object of the invention to provide a transmission arrangement of the foregoing general type wherein conditional transmission ratio errors of this transmission arrangement are reduced by inaccuracies in the production or manufacture of individual components of the transmission arrangement.

With the foregoing and other objects in view, there is provided, in accordance with the invention, a transmission arrangement comprising a plurality of transmission linkages, of which at least one performs an oscillating movement which is repeated, after the termination of a period in the course of a respectively further period, a control cam formed on a first one of the transmission linkages, a feeler roller rotatably mounted on a second one of the transmission linkages and representing a third transmission linkage, the control cam and a contact surface of the feeler roller being in operative rolling contact during at least part of a period repeating in the respective periods, a bearing support for the second transmission linkage, the second transmission linkage having a degree of freedom with respect to the bearing support for shifting the second transmission linkage due to deflections of the feeler roller mounted on the second transmission linkage as a result of a relative movement between the control cam and the feeler roller, the second transmission linkage having a first operational setting in the respective part of the period in accordance with a first contact location of the control cam with the feeler roller situated on the control cam, and the second transmission linkage also having a second operational setting in the respective part of the period in accordance with a second contact location of the control cam with the feeler roller, a point on the contact surface of the feeler roller which coincides with the first contact point in the first operational setting of the second transmission linkage coinciding at least approximately with the second contact point in the second operational setting of the second transmission linkage. In this regard, the inventive concept herein aims towards the reproducibility of that geometric ratio in the second operational setting of the second transmission linkage, as appears in the first operational setting thereof.

With a corresponding construction of the control cam, the transmission arrangement according to the invention is suitable in a particular manner for the drive of a pregripper of a sheet-fed rotary printing press because, with such a transmission arrangement, register errors are able to be reduced considerably in contrast with conventional pregripper devices with regard to the transfer of a sheet out of a first position in which it is aligned at front lays into a second position in which it is laid on a feeder drum. Advantageously, the reduction in the aforementioned register errors without having to fulfill excessive demands upon the accuracy of the individual components of the transmission arrangement. In this regard, a transmission arrangement in accordance with the invention need only be constructed so that the pregripper, in the first operational setting of the second transmission linkage, takes over or receives the sheet aligned at the front lays and, in the second operational setting of the second transmission linkage, surrenders or transfers it to the feeder drum. The reduction in the register errors thereby results, in the event of a radial impact of the feeler roller frequently occurring in practice, with the neglecting of further disadvantageous influences upon the transmission ratio of a transmission arrangement according to the invention, in that, with a coincidence of the second contact point in the second operational setting with that point on the contact surface of the feeling roller, which coincides in the first operational setting with the first contact point, the path covered from the second transmission with the shifting thereof from the first into the second operational setting in spite of necessary or desirable spatial positions of the second transmission linkage deviating from one another from period to period, is constant with respect to a respective nominal setting in the first and second operational setting. In contrast therewith, for conventional transmissions of this general type, a radial impact of the feeler roller has the effect, during a succession of a sufficient number of periods, of a deviation or fluctuation in the aforementioned path about a theoretical mean or average value with an amplitude which amounts to a double product of the amount of the radial impact and a transmission ratio of the transmission arrangement simplified as equally supposed or imputed in the vicinity of the two operational settings.

With the construction of the transmission arrangement according to the invention, a considerable increase in precision is thus achieved, the extent of which becomes clear from the foregoing comparison, according to which, when using the transmission arrangement according to the invention for a pregripper device, the register deviations occurring with conventional devices due to a radial impact of the feeler roller being almost completely suppressed.

In accordance with another feature of the invention, the feeler roller is formed with a hub, has roller bodies disposed for rolling on the hub, and a race carried by the roller bodies, a ratio of a respective diameter of one of the roller bodies to the diameter of the hub being such that the roller bodies, in the second operational setting of the second transmission linkage assume at least approximately the same relative position with respect to the race as in the first operational setting of the second transmission linkage. Accordingly, effects upon the aforementioned path of the second transmission linkage with the shifting from the first into the second operational setting are furthermore able to be suppressed, attributed to deviations in the mass of the roller bodies, and provided for supporting a race of the feeler roller.

In accordance with a further feature of the invention, the second transmission linkage is a driving rocker arm of a transmission system having a driven rocker arm and, between a first deflection of a first system point fixed with respect to the second transmission linkage and a second deflection of a second system point fixed with respect to the driven rocker arm in the first and the second operational setting, such different transmission ratios are provided that they oppose an influence upon both the operational settings which, at a radial impact of the feeler roller, results from different transmission angles effective between the control cam and the second transmission linkage. This construction takes into account the fact that the aforementioned path of the second transmission linkage of the transmission arrangement according to the invention covering from the first into the second operational setting, in the case of a feeler roller subjected to a radial impact, is subjected to given deviations or fluctuations only when a point of the contact surface of the feeler roller coinciding with the first contact point, in the first operational setting of the second transmission linkage, coincides with the second contact point, in the second operational setting of the second transmission linkage.

In accordance with a concomitant feature of the invention, at least one of the two contact points corresponding to a respective one of the two operational settings lies on a cam section of the control cam representing a rest path. Thus, that one contact point of the two contact points which corresponds to the first operational setting of the second transmission linkage is provided as a minimum. In this first operational setting, the second transmission linkage is thus at a standstill, so that, in the aforementioned application, a gripper system of the aforementioned pregripper, which is connected with the second transmission linkage, can grip a stationary sheet aligned at the front lays.

Other features which are considered as characteristic for the invention are set forth in the appended claims.

BRIEF DESCRIPTION OF THE DRAWINGS

Although the invention is illustrated and described herein as embodied in a transmission arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
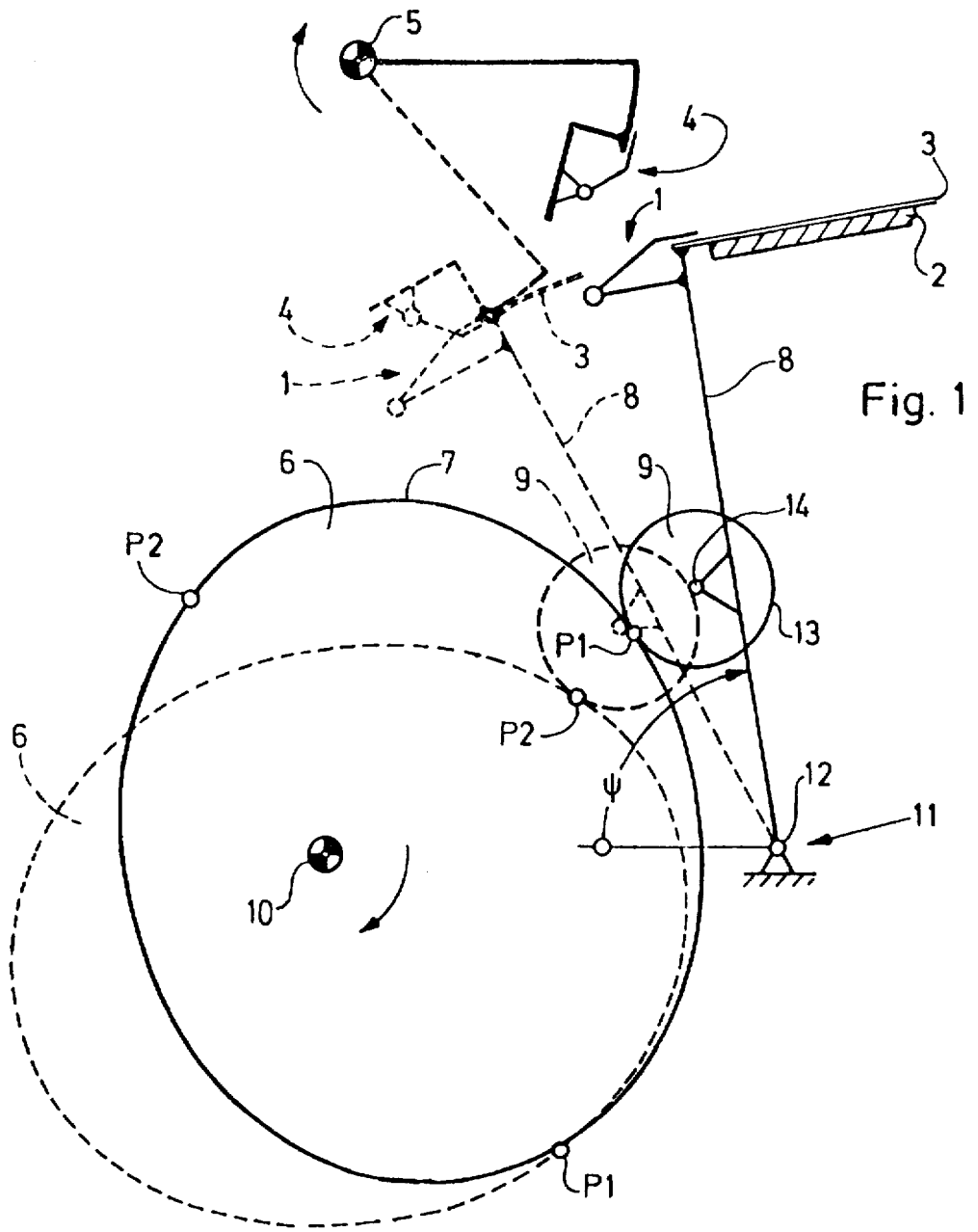
FIG. 1 is a diagrammatic and schematic view of a transmission arrangement according to the invention in two operational settings and a device cooperating with the transmission arrangement.

Referring now to the drawings and, first, particularly to FIG. 1 thereof, there is shown therein schematically and diagrammatically a transmission arrangement according to the invention applied for a special use, wherein a pregripper system 1 of an otherwise non-illustrated sheet-fed rotary printing press grips a sheet 3 in the vicinity of a leading edge thereof as the sheet 3 momentarily rests on a feed table 2, and transfers it to a rotating gripper system 4, the rotation of which is indicated in FIG. 1 by the arrow associated with the rotational axis 5. In FIG. 1, the transmission arrangement and the gripper system 4 cooperating therewith are shown in solid lines in a first position of the transmission linkages forming the transmission arrangement, and are shown in broken lines in a second position thereof.

According to the representation in FIG. 1, an embodiment of the transmission arrangement according to the invention includes a first transmission linkage 6 with a control cam 7 formed thereon and a second transmission linkage 8 with a feeler roller 9 representing a third transmission linkage rotatably mounted thereon. In the embodiment of the invention illustrated in FIG. 1, the first transmission linkage 6 is formed as a cam disk which revolves with operatively constant rotary speed about a transmission axis 10 in the direction of the arrow associated therewith in FIG. 1. Through the intermediary of non-illustrated positive guide means, an operative rolling contact is produced between the feeler roller 9 and the control cam 7. An example of a suitable positive guide means can be derived from the aforementioned published German Patent Document DE 38 30 946 C2. As a result of the revolving of the first transmission linkage 6 formed as a cam disk and of the rolling contact between the control cam 7 revolving therewith and of the feeler roller 9, a relative movement is produced between the control cam 7, on the one hand, and the feeler roller 9, on the other hand.

The second transmission linkage 8 is formed as a swivel arm in the exemplary embodiment of FIG. 1. Accordingly, a bearing support 11 supporting the second transmission linkage 8 is formed as a swivel bearing with a swivel shaft or axis 12, so that the second transmission linkage 8 in the form of the aforementioned swivel arm, for a shifting of the second transmission linkage 8 due to deflections of the feeler roller 9 mounted on the second transmission linkage 8 as a result of the relative movement between the control cam 7, on the one hand, and the feeler roller 9, on the other hand, with respect to the bearing 11, has a degree of freedom of the swivelling about the swivel axis 12.

The second transmission linkage 8 formed as a swivel arm performs an oscillating movement as a result of the operative rolling contact between the feeler roller 9 and the control cam 7 for each revolution of the first transmission linkage 6 formed as a cam disk; the oscillating movement is repeated after the termination of a period in the course of a respectively further period. In this regard, a respective period extends over a period duration T of a respective revolution of the first transmission linkage 6 (note FIG. 2).

To achieve the objective attained by the invention, it is not necessarily required that the control cam 7 be closed in itself. It must only be made so that a first and a second contact point P1 and P2 (note FIG. 1) lies on the contour of the control cam 7 in a manner that the second transmission linkage 8 is disposed in a first and a second operational setting, respectively, when the feeler roller 9 reaches the corresponding first and second contact points P1 and P2, respectively. Likewise, an operational rolling contact between the feeler roller 9 and the control cam 7 is also required only from the first contact point P1 to the second contact point P2 and expediently in an environment thereof on both sides, so that the aforementioned operational rolling contact can remain limited to a respective partial period T' within a respective period, the feeler roller 9 reaching initially the first contact point P1 and thereafter the second contact point P2 within such a partial period T'. The control cam 7, on the one hand, and the feeler roller 9, on the other hand, are coordinated with one another, in accordance with the invention, so that the length of a cam section of the control cam 7 lying between the two contact points P1 and P2, on the one hand, and the circumferential length of the contact surface 13 of the feeler roller 9, on the other hand, has a precisely integral ratio in the ideal case. Thus, a point of the contact surface 13 of the feeler roller 9 coinciding with the first contact point P1, in the first operative setting of the second transmission linkage 8, coincides at least approximately with the second contact point P2, in the second operative setting of the second transmission linkage 8.

Neglecting other effects upon the transmission ratio of a transmission arrangement formed in such a manner, transmission errors are corrected which originate from the fact that, in practice, the contact surface 13 of the feeler roller 9 is not exactly geometrically concentric with a center of rotation of the feeler roller 9 indicated at 14 in FIG. 1.

Figure 3:
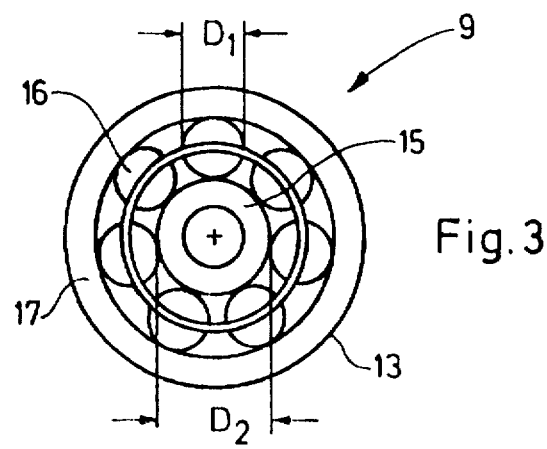
FIG. 3 is a front elevational view of an exemplary embodiment of a feeder roller furnished with roller bodies provided with data regarding dimensions pertinent to the invention.
Figure 4:
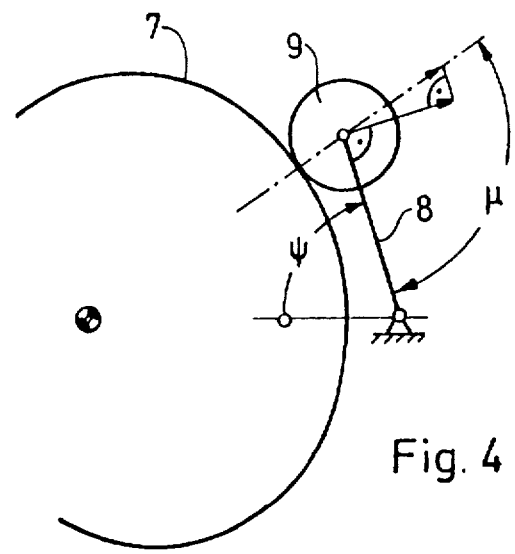
FIG. 4 a fragmentary view of FIG. 1 modified so as to represent the influence of a transmission angle effective between a control cam and a roller lever controlled thereby.

In continuation of the description of the inventive concept referred to hereinbefore, it is noted that the feeler roller 9, in accordance with the simplified representation of FIG. 3, is formed with a hub 15, roller bodies 16 roll on and around the hub 15, and a race 17 is carried by the roller bodies 16, the ratio of the diameter D1 of a roller body 16 to the diameter D2 of the hub 15 being such that the roller bodies 16 in the second operative setting assume at least approximately the same relative position with respect to the race 17 as in the first operative setting. According thereto, in a special case wherein the same transmission angle μ is present in both operative settings, the diameter D2 of the hub 15 is selected to be double the diameter D1 of the roller body 16, and the cam section of the control cam 7 lying between the contact points P1 and P2 is selected to be three times as long as the circumferential length of the contact surface 13 of the feeler roller 9, so that when there is a shifting of the second transmission linkage 8 from the first into the second operative setting thereof, the race 17 of the feeler roller 9 furnished with the roller bodies 16 actually performs three revolutions, while the roller bodies 16 actually perform two revolutions about the hub 15.

In the construction of the aforementioned diameters D1 and D2, from the various influences or effects upon the transmission ratio of the transmission arrangement according to the invention which were noted hereinabove, there is taken into account that, in the case of a feeler roller 9 with a race 17 carried by roller bodies 16, in addition to a possible eccentricity of the contact surface 13 with respect to the inner diameter of the race 17, deviations in the mass of the respective roller bodies 16 also exist.

A further negative influence or effect from those indicated hereinbefore as being disadvantageous with respect to the transmission ratio of a transmission arrangement deviating from the ideal geometry as a result of production inaccuracies is that, especially in the two operative settings, different transmission angles μ between the control cam 7 and the second transmission linkage 8 can exist. Thus, in accordance with a qualitatively represented further development of the invention in FIG. 5, provision is made for suppressing this negative effect, in that the second transmission linkage 8 is a driving rocker arm of a transmission system with a driven rocker arm 18, a couple transmission being selected as the transmission system and, furthermore, a special feature with a view towards a first deflection of a first system point A1 which is fixed with respect to the first transmission linkage 6, and towards a second deflection of a second system point A2 which is fixed with respect to the driven rocker arm 18, is found in the first and second operative setting. These transmission ratios are selected for the first and the second operative setting so that they oppose an influence upon both of the operative settings which results, in the case of a radial impact of the feeler roller 9, from different transmission angles μ being effective between the control cam 7 and the second transmission linkage 8. In this regard, starting from the differences of the respective first deflections occurring due to different transmission angles μ in the two operative settings, the parameters of the transmission linkages of the couple transmission following the second transmission linkage 8 can be determined iteratively.

With a view to the special application of such a constructed transmission arrangement for driving a pregripper, the second system point A2 is determined so that it it is located on a gripper seat of the pregripper.

Likewise with a view to the aforementioned special application, the control cam 7 is constructed so that it has a center of curvature coinciding with the transmission axis 10 in a given vicinity of the first contact point P1. Accordingly, one of the two contact points P1 and P2, which corresponds to one of the two operative settings, lies on a cam section of the control cam 7 representing a rest or guide path.

Figure 2:
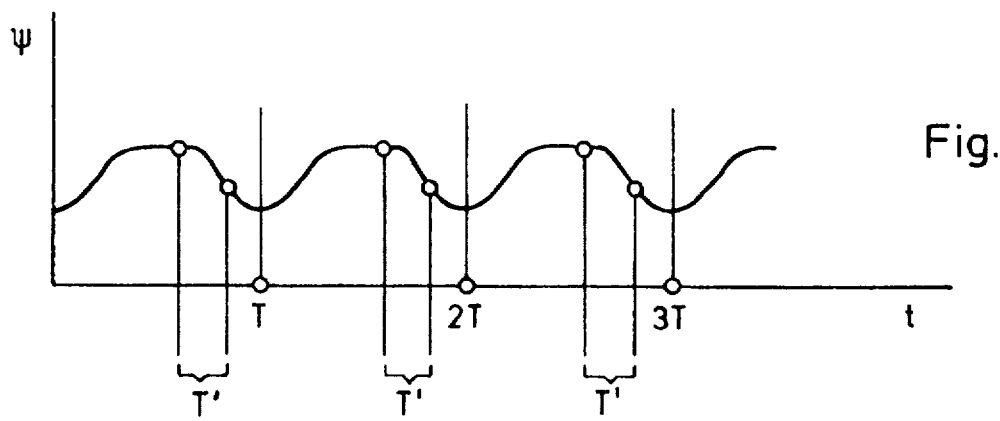
FIG. 2 is an idealized qualitative representation in a plot diagram of the shifting of the second transmission linkage due to deflections of the feeler roller supported on the second transmission linkage as a result of a relative movement between the control cam and the feeler roller.
Figure 5:
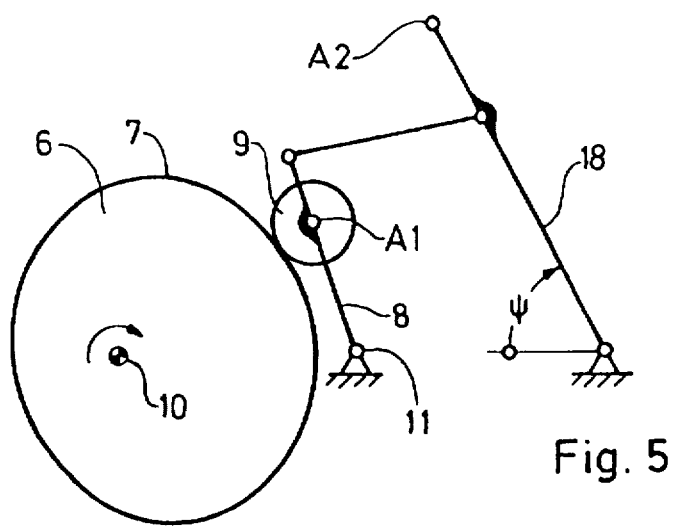
FIG. 5 is a qualitative view of a transmission arrangement according to the invention wherein a roller lever controlled by a control cam is formed as a driving rocker arm or beam of a transmission system.

The control cam 7 is so constructed for effecting a cooperation between a transmission arrangement according to the invention, which is used for driving a pregripper, and the rotating gripper system 4 diagrammatically and schematically illustrated in FIG. 1, that altogether an idealized qualitative course during the time t according to FIG. 2 occurs for an angle of inclination ψ of the second transmission linkage 8 and the driven rocker arm 18, respectively, according to FIG. 5, under the aforementioned condition of an operative constant rotary speed of the first transmission linkage 6. The beginning and the end, respectively, of a respective period having a period duration T are thereby placed arbitrarily into the respective minimum of the angle of inclination ψ.

For the direction of rotation of the first transmission linkage 6 indicated in FIG. 1, the feeler roller 9 initially travels through the first contact point P1 and, thereafter, the second contact point P2 within a respective partial period T'. At that time, the first contact point P1 lies on the aforementioned cam section of the control cam 7 representing a rest or guide path, and the second contact point P2 at a location on the control cam 7 at which the circumferential speed of a pregripper driven by means of the transmission arrangement has the circumferential speed of the rotating gripper system 4. Such a section of the course of the angle of inclination ψ represented in FIG. 2, in which this angle of inclination ψ is constant, thus corresponds, respectively, to the cam section of the control cam 7 representing a rest or guide path.

Because the foregoing description proceeds especially from a construction of the second transmission linkage 8 as a swivel arm, it should be noted that the second transmission linkage 8 may also, for example, be formed as a tamping or ramming tool within the scope of the invention.

As has been furthermore also indicated heretofore, in the sense of a rolling contact with the feeler roller 9, an active part of the control cam 7 could also be limited to a control segment within the contour of which the two contact points P1 and P2 lie. With such a development and revolving control cam 7, it would, however, be advantageous to take suitable precautions for preventing the angle of inclination ψ from falling short of a given value and, if necessary or desirable, to provide the the control segment with at least one suitable starting region whereon, in operation, then a respective contact P1, P2 follows.

I claim:

1. Transmission arrangement comprising a plurality of transmission linkages, at least one of said transmission linkages performing an oscillating movement which is repeated, after the termination of a period in the course of a respectively further period, a control cam formed on a first one of said transmission linkages, a feeler roller rotatably mounted on a second one of said transmission linkages, said control cam and a contact surface of said feeler roller being in operative rolling contact during at least part of a period repeating in the respective periods, a bearing support for said second transmission linkage, said second transmission linkage having a degree of freedom with respect to said bearing support for shifting said second transmission linkage due to deflections of said feeler roller mounted on said second transmission linkage as a result of a relative movement between said control cam and said feeler roller, said second transmission linkage having a first operational setting in the respective part of the period in accordance with a first contact location of said control cam with said feeler roller situated on said control cam, and said second transmission linkage also having a second operational setting in the respective part of the period in accordance with a second contact location of said control cam with said feeler roller, a point on said contact surface of said feeler roller which coincides with said first contact point in said first operational setting of said second transmission linkage coinciding at least approximately with said second contact point in said second operational setting of said second transmission linkage.

2. Transmission arrangement according to claim 1, wherein said feeler roller is formed with a hub, has roller bodies disposed for rolling on said hub, and a race carried by said roller bodies, a ratio of a respective diameter of one of said roller bodies to the diameter of said hub being such that said roller bodies, in said second operational setting of said second transmission linkage assume at least approximately the same relative position with respect to said race as in said first operational setting of said second transmission linkage.

3. Transmission arrangement according to claim 1, wherein said second transmission linkage is a driving rocker arm of a transmission system having a driven rocker arm and, between a first deflection of a first system point fixed with respect to said second transmission linkage and a second deflection of a second system point fixed with respect to said driven rocker arm in said first and said second operational setting, such different transmission ratios are provided that they oppose an influence upon both both operational settings which, at a radial impact of the feeler roller, results from different transmission angles effective between said control cam and said second transmission linkage.

4. Transmission arrangement according to claim 1, wherein at least one of said two contact points corresponding to a respective one of said two operational settings lies on a cam section of said control cam representing a rest path.

* * * * *

UNITED STATES PATENT AND TRADEMARK OFFICE
CERTIFICATE OF CORRECTION

PATENT NO. : 5,544,546

DATED : August 13, 1996

INVENTOR(S) : Doepke

Page 1 of 2

It is certified that error appears in the above-indentified patent and that said Letters Patent is hereby corrected as shown below:

Column 7, line 39, after "linkages" (before the comma) add --and having a contact surface-- ;

line 40, change "a" to --said-- .

Column 8, line 7, change "contact" to --control cam--;

change "of" to --defining, on--;

after "cam" add --,--;

delete --with said feeler roller--;

line 8, delete --situated on--;

before "said control cam" add --a first contact point in which--;

after "said control cam" (before the comma) add --contacts said feeler roller--.

UNITED STATES PATENT AND TRADEMARK OFFICE
CERTIFICATE OF CORRECTION

PATENT NO. : 5,544,546
DATED : August 13, 1996
INVENTOR(S) : Doepke

It is certified that error appears in the above-indentified patent and that said Letters Patent is hereby corrected as shown below:

Column 8, line 11, change "contact" to --cam--;
change "of" to --defining, on--;
delete --with said feeler--;
before "roller" add --,a second contact point in which said control cam contacts said feeler--.

Signed and Sealed this

Nineteenth Day of August, 1997

*Attest:*

BRUCE LEHMAN

*Attesting Officer*    Commissioner of Patents and Trademarks